(12) United States Patent
Itoo et al.

(10) Patent No.: US 8,556,015 B2
(45) Date of Patent: Oct. 15, 2013

(54) UTILITY VEHICLE

(75) Inventors: Seiji Itoo, Akashi (JP); Hideaki Kii, Kakogawa (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 77 days.

(21) Appl. No.: 13/269,341

(22) Filed: Oct. 7, 2011

(65) Prior Publication Data
US 2013/0087396 A1 Apr. 11, 2013

(51) Int. Cl.
*B60K 11/00* (2006.01)
(52) U.S. Cl.
USPC .......... 180/68.1; 180/68.3; 180/68.2
(58) Field of Classification Search
USPC .............. 180/68.3, 68.1, 68.2, 908, 291, 339, 180/292
See application file for complete search history.

(56) References Cited

U.S. PATENT DOCUMENTS

| | | | | |
|---|---|---|---|---|
| 3,766,575 | A * | 10/1973 | Grengs | 4/210 |
| 4,697,665 | A | 10/1987 | Eastman et al. | |
| 6,510,912 | B1 * | 1/2003 | Atsuumi | 180/69.1 |
| 6,820,708 | B2 * | 11/2004 | Nakamura | 180/68.2 |
| 6,938,676 | B2 | 9/2005 | Lan et al. | |
| 7,562,739 | B2 | 7/2009 | Lan et al. | |
| 7,717,206 | B2 * | 5/2010 | Tanaka et al. | 180/68.3 |
| 7,882,911 | B2 | 2/2011 | Nobuhira | |
| 7,967,100 | B2 * | 6/2011 | Cover et al. | 180/312 |
| 8,002,061 | B2 * | 8/2011 | Yamamura et al. | 180/68.1 |
| 8,091,670 | B2 * | 1/2012 | Suzuki et al. | 180/89.2 |
| 8,256,563 | B2 * | 9/2012 | Suzuki et al. | 180/292 |
| 2002/0134598 | A1 | 9/2002 | Nakamura et al. | |
| 2003/0066696 | A1 | 4/2003 | Nakamura | |
| 2004/0195018 | A1 * | 10/2004 | Inui et al. | 180/68.1 |
| 2006/0011401 | A1 | 1/2006 | Nakamura et al. | |
| 2006/0270503 | A1 * | 11/2006 | Suzuki et al. | 474/144 |
| 2009/0183937 | A1 * | 7/2009 | Yamamura et al. | 180/89.2 |
| 2010/0155170 | A1 * | 6/2010 | Melvin et al. | 180/339 |
| 2010/0167853 | A1 | 7/2010 | Morita | |
| 2011/0048828 | A1 | 3/2011 | Sunsdahl et al. | |
| 2011/0220429 | A1 | 9/2011 | Yamamura et al. | |
| 2012/0247846 | A1 | 10/2012 | Ichikawa | |
| 2012/0289370 | A1 | 11/2012 | Yamanishi et al. | |

OTHER PUBLICATIONS

Itoo, Seiji et al., "Belt-Type Continuously Variable Transmission" U.S. Appl. No. 13/267,721, filed Oct. 6, 2011, 28 pages.
Itoo, Seiji et al., "Belt-Type Continuously Variable Transmission" U.S. Appl. No. 13/267,734, filed Oct. 6, 2011, 29 pages.
Itoo, Seiji et al., "Utility Vehicle" U.S. Appl. No. 13/269,361, filed Oct. 7, 2011, 30 pages.

* cited by examiner

*Primary Examiner* — Hau Phan
(74) *Attorney, Agent, or Firm* — Alleman Hall McCoy Russell & Tuttle, LLP (57) ABSTRACT

A utility vehicle is provided. The utility vehicle may comprise a vehicle body frame; a dash panel having a first duct port in a substantially center portion widthwise; a hood located in front of the dash panel; a driving power source mounted to a substantially center portion of the vehicle body frame widthwise and positioned behind the dash panel; a transmission joined to the driving power source; and a first air-intake duct provided in a substantially center portion of the vehicle body frame widthwise such that it extends in a substantially forward and rearward direction and passes through the first duct port. Further, an outlet provided at a downstream end portion of the first air-intake duct is coupled to the transmission; and an inlet provided at an upstream end portion of the first air-intake duct is positioned in an upper rear portion of the space above the first duct port.

10 Claims, 6 Drawing Sheets

UTILITY VEHICLE

BACKGROUND OF THE INVENTION

1. Field of the Invention

The present invention relates to a utility vehicle including a transmission and an air-intake duct through which cooling air is supplied to the transmission.

2. Description of the Related Art

United States Patent Application Publication No. 2010/0167853 discloses a conventional four-wheel vehicle including a CVT, and an air-intake duct through which cooling air is supplied to the CVT. In this four-wheel vehicle, the CVT has a transmission case body, and an air inlet opens on the upper wall of the transmission case body. An air-intake duct is coupled to the air inlet. The air-intake duct extends substantially forward from the air inlet. The inlet of the air-intake duct opens forward inside a hood. Because of this structure, water which has entered the hood is likely to flow into the CVT through the inlet of the air-intake duct and an air passage, when the four-wheel vehicle is traveling over a water paddle, a river, or the like.

SUMMARY OF THE INVENTION

An object of the present invention is to improve waterproofness of an air-intake duct.

A utility vehicle of the present invention comprises a vehicle body frame; a dash panel provided in a front portion of the vehicle body frame and having a first duct port in a substantially center portion in a vehicle width direction; a hood provided in a front portion of the vehicle body frame such that the hood is located in front of the dash panel, the hood covering a space defined by the dash panel; a driving power source mounted to a substantially center portion of the vehicle body frame in the vehicle width direction such that the driving power source is positioned behind the dash panel; a transmission joined to the driving power source; and a first air-intake duct provided in a substantially center portion of the vehicle body frame in the vehicle width direction such that the first air-intake duct extends in a substantially forward and rearward direction and passes through the first duct port; wherein an outlet provided at a downstream end portion of the first air-intake duct is coupled to the transmission; and an inlet provided at an upstream end portion of the first air-intake duct is positioned in an upper portion of the space which is above the first duct port, in a rear portion of the space.

Typically, the upper surface of the hood decreases in height from its rear portion toward its front portion. Typically, a portion of the upper surface of the hood, which corresponds to the rear portion of the space covered with the hood is highest. In the above configuration, since the inlet of the first air-intake duct is positioned in the upper portion of the space in the rear portion of the space, the inlet can be positioned higher. This makes it possible to suppress water splashing in the space from reaching the inlet. In addition, since the inlet of the first air-intake duct is positioned above the first duct port, a portion of the dash panel which is located above the first duct port can inhibit the water splashing in the space from moving toward the inlet.

The above and further objects, features and advantages of the invention will more fully be apparent from the following detailed description with reference to the accompanying drawings.

DETAILED DESCRIPTION OF THE PREFERRED EMBODIMENTS

Hereinafter, an embodiment of the present invention will be described with reference to the drawings. The stated directions are referenced from the perspective of a driver riding in the utility vehicle. A rightward and leftward direction conforms to a vehicle width direction. It is supposed that the utility vehicle is in a stopped state on a ground surface which is substantially parallel to a horizontal plane.

Figure 1:
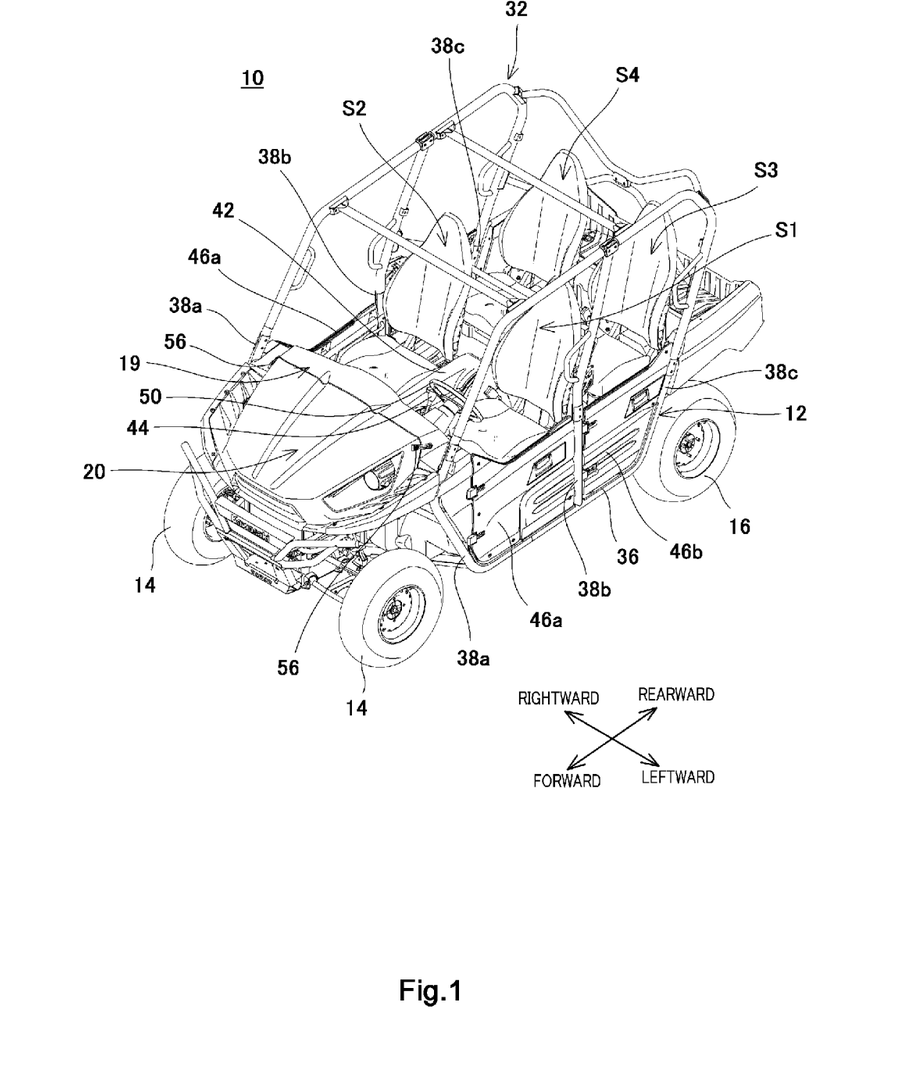
FIG. 1 is a perspective view showing an external appearance of a utility vehicle according to an embodiment, when viewed from forward and obliquely above.
Figure 2:
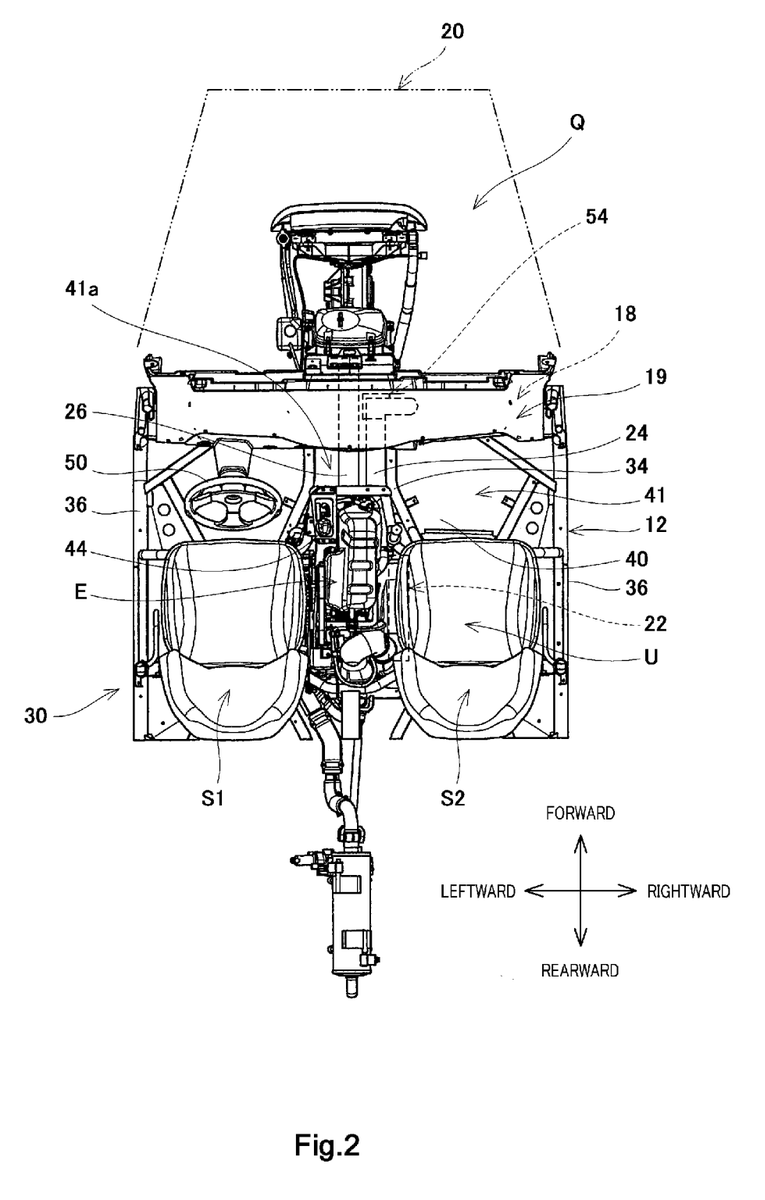
FIG. 2 is a plan view showing the internal configuration of a center portion of the utility vehicle in a forward and rearward direction.
Figure 3:
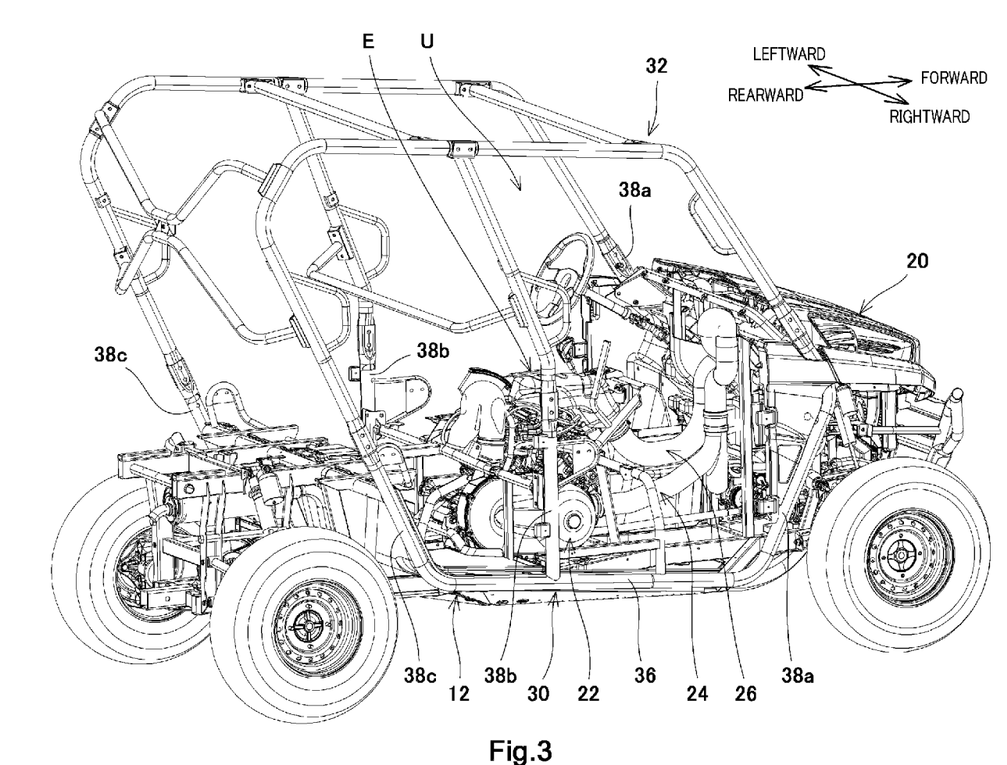
FIG. 3 is a perspective view showing the internal configuration of the utility vehicle when viewed from obliquely rearward.

FIG. 1 is a perspective view showing an external appearance of a utility vehicle 10 according to an embodiment, when viewed from forward and obliquely above. FIG. 2 is a plan view showing the internal configuration of a center portion of the utility vehicle 10 in a forward and rearward direction. FIG. 3 is a perspective view showing the internal configuration of the utility vehicle 10 when viewed from obliquely rearward.

As shown in FIG. 1, the utility vehicle 10 includes a vehicle body frame 12, a pair of right and left front wheels 14 suspended from the front portion of the vehicle body frame 12, a pair of right and left rear wheels 16 suspended from the rear portion of the vehicle body frame 12, and four seats S1~S4 mounted on the vehicle body frame 12 between the front wheels 14 and the rear wheels 16. The front seats S1 and S2 are arranged side by side in the rightward and leftward direction. Behind the front seats S1 and S2, the rear seats S3 and S4 are arranged side by side in the rightward and leftward direction, respectively. The left seat S1 at the front side is a driver seat on which the driver is seated. The utility vehicle 10 of the present embodiment is a four-wheel-drive vehicle, and both of the front wheels 14 and the rear wheels 16 are drive wheels.

As shown in FIG. 2, the utility vehicle 10 includes a dash panel 18 provided in the front portion of the vehicle body frame 12, and a hood 20 provided in the front portion of the vehicle body frame 12 such that it is located in front of the dash panel 18 to cover a space Q defined by the dash panel 18. The utility vehicle 10 includes an engine E mounted to a substantially center portion of the vehicle body frame 12 in the vehicle width direction such that the engine E is positioned behind the dash panel 18, a transmission 22 positioned at the right side of the engine E in the vehicle width direction, and joined to the engine E, a first air-intake duct 24 through which cooling air is supplied to the transmission 22, and a second air-intake duct 26 through which combustion air is supplied to the engine E.

As shown in FIG. 3, the vehicle body frame 12 includes a main frame 30 for supporting the engine E and the like, and a cabin frame (ROPS) 32 surrounding a cabin U. As shown in FIG. 2, the main frame 30 includes a floor member 34 facing the road surface or the ground surface, and side pipe elements 36 extending in the forward and rearward direction, from right and left end portions of the floor member 34. As shown in FIG. 3, the main frame 30 includes first lower pillar pipe elements 38a extending upward from the front end portions of the side pipe elements 36, respectively, second lower pillar pipe elements 38b extending upward from the center portions of the side pipe elements 36, respectively in the forward and rearward direction, and third lower pillar pipe elements 38c extending upward from the rear end portions of the side pipe elements 36, respectively.

As shown in FIG. 2, a floor panel 40 is mounted to the floor member 34 and to the side pipe elements 36. The floor member 34, the side pipe elements 36 and the floor panel 40 constitute a floor section 41. The engine E is mounted to a substantially center portion of the floor member 34 in the vehicle width direction. An air inlet 41a is provided on a portion of the floor section 41 which is in front of the engine E to take in air for cooling the engine E.

As shown in FIG. 1, between the seat S1 and the seat S2, a console box 42 is disposed to cover the engine E (FIG. 2) and the air inlet 41a (FIG. 2). A shift lever 44 is disposed to a substantially center portion of the console box 42 in the vehicle width direction. A front door 46a is mounted to each of the first lower pillar pipe elements 38a and the corresponding second lower pillar pipe elements 38b, while a rear door 46b is mounted to each of the second lower pillar pipe elements 38b and the corresponding third lower pillar pipe element 38c.

Figure 4:
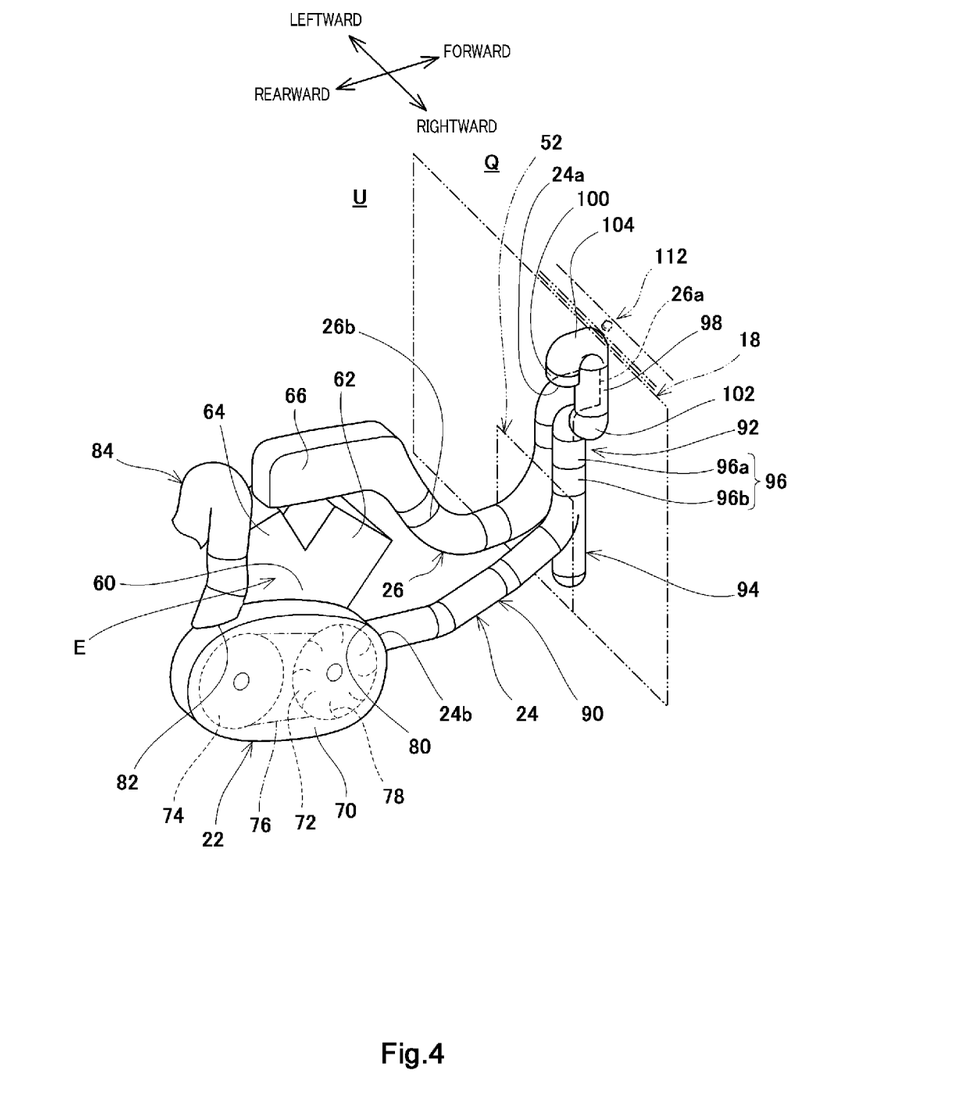
FIG. 4 is a perspective view showing the configuration of a transmission, a first air-intake duct, an engine, a second air-intake duct, and a dash panel, when viewed from rearward and obliquely above.
Figure 5:
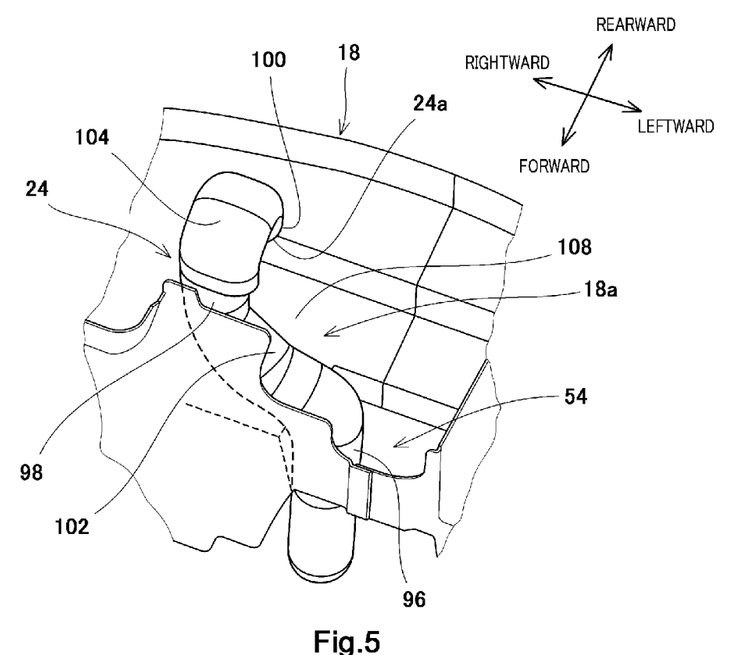
FIG. 5 is a perspective view showing a positional relationship between the dash panel and the first air-intake duct, when viewed from forward and obliquely above.
Figure 6:
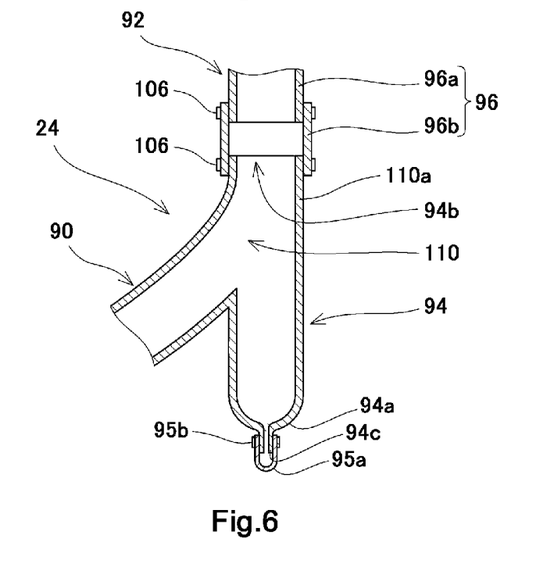
FIG. 6 is cross-sectional view showing the configuration of a part of the first air-intake duct.

FIG. 4 is a perspective view showing the configuration of the transmission 22, the first air-intake duct 24, the engine E, the second air-intake duct 26, and the dash panel 18, when viewed from rearward and obliquely above. FIG. 5 is a perspective view showing a positional relationship between the dash panel 18 and the first air-intake duct 24, when viewed from forward and obliquely above. FIG. 6 is cross-sectional view showing the configuration of a part of the first air-intake duct 24. In FIG. 4, the dash panel 18 is schematically indicated by a two-dotted line.

As shown in FIG. 2, the dash panel 18 is a substantially plate-shaped member defining the space Q and the cabin U. The dash panel 18 is provided on front and rear surfaces thereof with convex portions and dented portions (these portions are not shown in FIG. 2) to attach switches (not shown) thereto or ensure stiffness. As shown in FIG. 4, the dash panel 18 is provided with a first duct port 52 through which the first air-intake duct 24 and the second air-intake duct 26 pass in the forward and rearward direction, at the lower portion of a substantially center portion of the dash panel 18 in the vehicle width direction. In addition, as shown in FIG. 5, the dash panel 18 is provided in a front portion thereof with a second duct port 54 through which the first air-intake duct 24 passes vertically (in an upward and downward direction). As shown in FIG. 2, a cover 19 is provided over the dash panel 18 to cover the upper end portion of the dash panel 18. As shown in FIG. 2, in the present embodiment, the floor section 41 has an air inlet 41a in a portion thereof. The air inlet 41a communicates with the space Q via the first duct port 52 (see FIG. 4), or the like.

As shown in FIG. 2, the hood 20 is a substantially-plate-shape member covering the space Q defined by the dash panel 18. As shown in FIG. 1, the rear end portion of the hood 20 is mounted to the cover 19 via stoppers 56. As shown in FIG. 1, the upper surface of the hood 20 is tilted such that it decreases in height from its rear portion to its front portion. The height of the upper surface of the hood 20 is highest in a rear portion of the space Q (FIG. 2) defined by the dash panel 18 (FIG. 2) and covered with the hood 20. Although not shown, in alternative embodiments, a dash panel and a cover may constitute a single unitary component, and the rear end portion of the hood may be mounted to the vehicle body frame via a hinge member or the like.

As shown in FIG. 4, the engine E is a four-stroke V-type two-cylinder engine. An engine output shaft (not shown) extends in a substantially vehicle width direction. The engine E includes a crankcase 60 for rotatably supporting the engine output shaft (not shown), a front cylinder 62 extending forward and obliquely upward from the crankcase 60, and a rear cylinder 64 extending rearward and obliquely upward from the crankcase 60. An air-intake chamber 66 and an exhaust pipe (not shown) are coupled to the front cylinder 62 and to the rear cylinder 64. The second air-intake duct 26 is coupled to the air-intake chamber 66.

As shown in FIG. 4, the transmission 22 is a V-belt-type automatic transmission and includes a case 70, a drive pulley 72, a driven pulley 74, and a V-belt 76 coupling the drive pulley 72 to the driven pulley 74. The engine output shaft (not shown) of the engine E is coupled to the drive pulley 72, while the front wheels 14 and the rear wheels 16 (FIG. 1) are coupled to the driven pulley 74 via a driving power transmission mechanism (not shown) including transmission gears (not shown). The drive pulley 72 is provided with fins 78 for causing an air flow. The case 70 is provided with an air inlet 80 and an air outlet 82. The first air-intake duct 24 is coupled to the air inlet 80, while an air discharge duct 84 is coupled to the air outlet 82.

As shown in FIG. 4, when the drive pulley 72 rotates according to the rotational force transmitted from the engine output shaft (not shown), the rotational force is transmitted to the driven pulley 74 via the V-belt 76, and then to the front wheels 14 and to the rear wheels 16 (FIG. 1) via a driving power transmission mechanism (not shown). According to the rotation of the drive pulley 72, the fins 78 rotate along with the drive pulley 72, thereby allowing the air to be discharged from inside the case 70 through the air outlet 82, and the air to be taken into the case 70 through the air inlet 80, thereby cooling the interior of the transmission 22.

As shown in FIG. 4, the first air-intake duct 24 takes in cooling air into the case 70 of the transmission 22, and is provided in a substantially center portion of the vehicle body frame 12 (FIG. 2) in the vehicle width direction such that the first air-intake duct 24 extends in a substantially forward and rearward direction and passes through the first duct port 52. An outlet 24b provided at the downstream end portion of the first air-intake duct 24 is coupled to the transmission 22. An inlet 24a provided at the upstream end portion of the first air-intake duct 24 is positioned in the upper portion of the space Q which is above the first duct port 52, in the rear portion of the space Q.

As shown in FIG. 4, the first air-intake duct 24 includes a main duct element 90 extending in the substantially forward and rearward direction to pass through the first duct port 52, an introduction duct element 92 extending substantially upward from the upstream end portion of the main duct element 90, in the rear portion of the space Q covered with the hood 20 (FIG. 2), and a drain trap 94 extending downward from the lower end portion of the introduction duct element 92.

As shown in FIG. 4, the introduction duct element 92 includes a base duct portion 96 extending substantially upward from the upstream end portion of the main duct element 90 so as to pass through the second duct port 54 (FIG. 5), a first duct portion 98 extending substantially vertically (in an upward and downward direction) above the base duct portion 96, and a second duct portion 100 extending substantially vertically in a position behind the first duct portion 98. The introduction duct element 92 includes a substantially-L-shaped first coupling duct portion 102 for providing communication between the upper end portion of the base duct portion 96 and the lower end portion of the first duct portion 98, and a substantially-inverted-U-shaped second coupling duct portion 104 for providing communication between the upper end portion of the first duct portion 98 and the upper end portion of the second duct portion 100. The inlet 24a for taking in the air is provided at the lower end portion of the second duct portion 100. A suspension mechanism 112 is mounted to a substantially-inverted-U-shaped bent portion of the upper end portion of the introduction duct element 92.

As shown in FIG. 5, the first duct portion 98 is deviated in the vehicle width direction (to the right in the present embodiment) from the base duct portion 96 when viewed from above, while the second duct portion 100 is deviated in a rearward direction from the first duct portion 98 when viewed from above. Thereby, at least a portion (an entire portion in the present embodiment) of the inlet 24a is deviated in the vehicle width direction from the second duct port 54 when viewed from above, and opens to face an upper surface 108 of a portion 18a of the dash panel 18.

As shown in FIG. 6, the base duct portion 96 includes a short-pipe portion 96a having an upstream end portion coupled to the downstream end portion of the first coupling duct portion 102 (FIG. 4) and a connecting portion 96b having a substantially pipe-shape and made of rubber. The downstream end portion of the short-pipe portion 96a is inserted into the upstream end portion of the connecting portion 96b. The upstream end portion of the main duct element 90 is inserted into the downstream end portion of the connecting portion 96b. Substantially annular fastener bands 106 are attached to the outer peripheral surface of the upstream end portion of the connecting portion 96b and the outer peripheral surface of the downstream end portion of the connecting portion 96b, respectively. That is, the downstream end portion of the introduction duct element 92 is removably coupled to the upstream end portion of the main duct element 90 via the rubber-made connecting portion 96b.

As shown in FIG. 6, the drain trap 94 is a member having a substantially bottomed tube shape and extending substantially vertically. The drain trap 94 has a bottom portion 94a at a lower end portion thereof. The drain trap 94 has an opening 94b at an upper end portion thereof. A drain port 94c of a substantially short-pipe shape is provided at the bottom portion 94a to protrude downward. A cap 95a made of transparent resin is coupled to the drain port 94c by a substantially annular clip 95b.

As shown in FIG. 6, the upstream end portion of the main duct element 90 and the upper end portion of the drain trap 94 have a unitary structure to constitute a branch portion 110 of a substantially-inverted-Y-shape. An upper end portion 110a of the branch portion 110 is the upstream end portion of the main duct element 90 and is the upper end portion of the drain trap 94. The upper end portion 110a of the branch portion 110 is removably coupled to the lower end portion of the introduction duct element 92 by the connecting portion 96b.

As shown in FIG. 6, by separating the upper end portion 110a of the branch portion 110 from the connecting portion 96b, the upstream end portion of the main duct element 90 and the downstream end portion of the introduction duct element 92 are separated from each other, and the upper end portion of the drain trap 94 and the lower end portion of the introduction duct element 92 are separated from each other, thereby opening the opening 94b of the drain trap 94. When sand, stone, and others are accumulated in the drain trap 94, they can be discharged through the opening 94b. When water is accumulated in the cap 95a, the water can be discharged by loosening the clip 95b and then by detaching the cap 95a from the drain port 94c.

As shown in FIG. 4, the second air-intake duct 26 is configured to take combustion air into the air-intake chamber 66 coupled to the engine E. The second air-intake duct 26 is provided in a substantially center portion of the vehicle body frame 12 (FIG. 2) in the vehicle width direction such that it extends in a substantially forward and rearward direction and passes through the first duct port 52. An outlet 26b provided at the downstream end portion of the second air-intake duct 26 is coupled to the engine E via the air-intake chamber 66. An inlet 26a provided at the upstream end portion of the second air-intake duct 26 is positioned in the space Q covered with the hood 20 (FIG. 2). The first air-intake duct 24 and the second air-intake duct 26 are laid out such that they are deviated from each other in the vehicle width direction and in the vertical direction (upward and downward direction). The first air-intake duct 24 and the second air-intake duct 26 partially overlap with each other when viewed from above and when viewed from the side.

Figure 7:
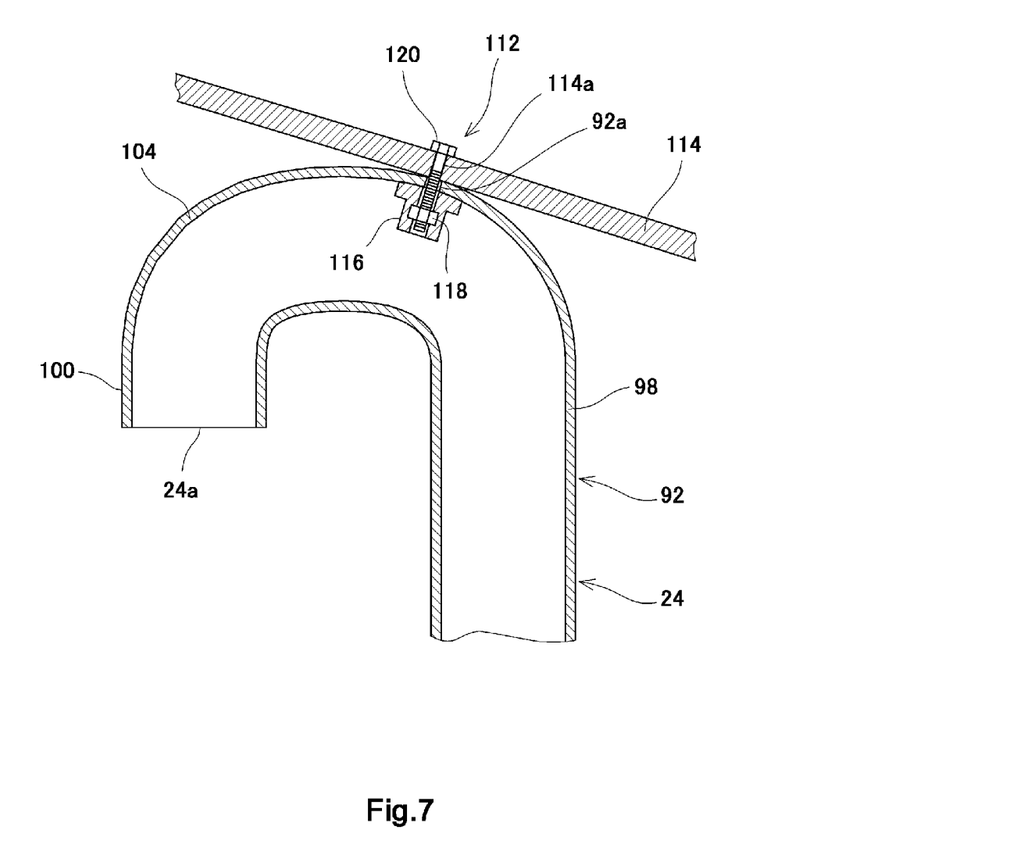
FIG. 7 is a cross-sectional view showing a suspension mechanism.

As shown in FIG. 7, the suspension mechanism 112 is configured to suspend the introduction duct element 92 of the first air-intake duct 24 from a support frame 114 provided in the vehicle body frame 12 (FIG. 2). The suspension mechanism 112 includes a substantially tubular buffer member 116 made of an elastic material such as rubber, a nut 118 incorporated into the inner peripheral portion of the buffer member 116, and a bolt 120 threadingly engaged with the nut 118. The substantially-inverted-U-shaped bent portion of the upper end portion of the introduction duct element 92 has a through-hole 92a. On the inner surface of the through-hole 92a, the buffer member 116 and the nut 118 are disposed to correspond to the through-hole 92a. The support frame 114 has a through-hole 114a communicating with the through-hole 92a. A bolt 120 is inserted into the through-hole 92a and the through-hole 114a from substantially above, and is threadingly engaged with the nut 118. In a state where the bolt 120 is threadingly engaged with the nut 118, the buffer member 116 is compressingly deformed and a portion of the buffer member 116 closely contacts the inner surface of the introduction duct element 92.

When the utility vehicle 10 of FIG. 1 is driving over a water puddle or a stream, water flows into the space Q covered with the hood 20 and splashes into the space Q. As shown in FIG. 4, in the present embodiment, the inlet 24a of the first air-intake duct 24 is positioned at the upper portion of the space Q which is above the first duct port 52, in the rear portion of the space Q. Thus, the inlet 24a is in a relatively high position. Because of this, water which would splash in the space Q is less likely to reach the inlet 24a. This makes it possible to suppress the water from flowing into the first air-intake duct 24, and hence suppress degradation of the performance of the transmission 22 which would be caused by entry of the water.

As shown in FIG. 4, the introduction duct element 92 extends substantially upward from the upstream end portion of the main duct element 90 in the rear portion of the space Q, and the inlet 24a of the first air-intake duct is positioned in close proximity to the dash panel 18 in the upper portion of the space Q which is above the first duct port 52. As shown in FIG. 5, the upper end portion of the introduction duct element 92 is bent in the substantially-inverted-U shape, and the inlet 24a of the first air-intake duct opens downward to face the upper surface 108 of the portion 18a of the dash panel 18. As shown in FIG. 5, the second duct portion 100 is deviated in the rearward direction from the first duct portion 98 when viewed from above. As shown in FIG. 4, the inlet 24a is deviated in the rearward direction from the first duct portion 98, when viewed from above, and is positioned above the lower end portion of the first duct portion 98. Furthermore, as shown in FIG. 5, at least a portion of the inlet 24a is deviated in the vehicle width direction from the second duct port 54 when viewed from above. Therefore, the dash panel 18, the first duct portion 98 and the second duct port 54 can inhibit the water splashing in the space Q from reaching the inlet 24a.

As shown in FIG. 4, the first air-intake duct 24 and the second air-intake duct 26 are laid out such that they are deviated from each other in the vehicle width direction and in the vertical direction (upward and downward direction), while the first air-intake duct 24 and the second air-intake duct 26 partially overlap with each other when viewed from above and when viewed from the side. Therefore, the first air-intake duct 24 and the second air-intake duct 26 can be laid out compactly in a narrow space formed under the console box 42 (FIG. 1).

As shown in FIG. 6, the opening 94b is provided on the upper end portion of the drain trap 94, and the upper end portion of the drain trap 94 is removably coupled to the lower end portion of the introduction duct element 92. Therefore, by separating the drain trap 94 and the introduction duct element 92 from each other, sand, stone, and others accumulated in the drain trap 94 can be discharged through the opening 94b.

As shown in FIG. 6, the upstream end portion of the main duct element 90 and the downstream end portion of the introduction duct element 92 are removably coupled together, via the rubber-made connecting portion 96b. The rubber-made connecting portion 96b can attenuate a vibration generated in the first air-intake duct 24, and allows the first air-intake duct 24 to have water-proofness.

As shown in FIG. 4, the introduction duct element 92 is compactly configured to include the base duct portion 96 extending substantially vertically (in the upward and downward direction), the first duct portion 98 extending substantially vertically, the second duct portion 100 extending substantially vertically, the first coupling duct portion 102 of a substantially-L-shape, and the second coupling duct portion 104 of a substantially-inverted-U-shape.

As shown in FIG. 7, by fastening the upper end portion of the introduction duct element 92 to the support frame 114 by means of the suspension mechanism 112, the first air-intake duct 24 can be easily suspended in the space Q. In addition, the buffer member 116 constituting the suspension mechanism 112 can attenuate a vibration generated in the air-intake duct 24 and prevent the nut 118 from getting loose.

As shown in FIG. 4, in the above stated embodiment, the V-belt-type automatic transmission is used as the transmission 22, and the transmission 22 is positioned at the right side of the engine E. However, the type and position of the transmission 22 are not particularly limited. For example, in alternative embodiments, the V-belt-type automatic transmission or other transmission may be positioned behind or at the left side of the engine E.

As shown in FIG. 6, in the above embodiment, the rubber-made connecting portion 96b is used to attenuate the vibration generated in the first air-intake duct 24 and to enhance the water-proofness of the first air-intake duct 24. However, the vibration of the first air-intake duct 24 can be attenuated so long as the connecting portion is flexible. Therefore, in alternative embodiments, other flexible connecting portion such as a connecting portion made of soft resin or a bellows-like connecting portion may be used, instead of the rubber-made connecting portion 96b.

Although in the above embodiment, the engine E is used as a "driving power source" as shown in FIG. 4, an electric motor may be used as the "driving power source," or otherwise both of the engine E and the electric motor may be used as the "driving power source," in alternative embodiments.

Although in the above embodiment, the suspension mechanism 112 is mounted to the support frame 114 as shown in FIG. 7, it may be mounted to the dash panel 18 (FIG. 4), the vehicle body frame 12 (FIG. 2), or the like, in alternative embodiments.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A utility vehicle comprising:
    a vehicle body frame;
    a dash panel provided in a front portion of the vehicle body frame and having a first duct port in a substantially center portion in a vehicle width direction;
    a hood provided in the front portion of the vehicle body frame such that the hood is located in front of the dash panel, the hood covering a space defined by the dash panel;
    a driving power source mounted to the substantially center portion of the vehicle body frame in the vehicle width direction such that the driving power source is positioned behind the dash panel;
    a transmission joined to the driving power source; and
    a first air-intake duct provided in the substantially center portion of the vehicle body frame in the vehicle width direction such that the first air-intake duct extends in a substantially forward and rearward direction and passes through the first duct port;
    wherein an outlet provided at a downstream end portion of the first air-intake duct is coupled to the transmission; and
    an inlet provided at an upstream end portion of the first air-intake duct is positioned in an upper portion of the space which is above the first duct port, in a rear portion of the space;
    wherein the first air-intake duct includes:
        a main duct element extending in the substantially forward and rearward direction such that the main duct element passes through the first duct port; and
        an introduction duct element provided in the rear portion of the space covered with the hood such that the introduction duct element extends substantially upward from an upstream end portion of the main duct element;
        the inlet is provided at an upstream end portion of the introduction duct element;
        an upper end portion of the introduction duct element includes a first duct portion extending substantially vertically, a second duct portion extending substantially vertically, and a coupling duct portion of a substantially-inverted-U-shape for providing communication between an upper end portion of the first duct portion and an upper end portion of the second duct portion, the first duct portion, the second duct portion and the coupling duct portion forming a substantially-inverted-U-shape;

the second duct portion is deviated in a rearward direction from the first duct portion when viewed from above; and the inlet is provided at a lower end portion of the second duct portion.

2. The utility vehicle according to claim 1, wherein the inlet opens downward so as to face an upper surface of a portion of the dash panel.

3. The utility vehicle according to claim 1, wherein
the inlet is deviated in a rearward direction from the first duct portion when viewed from above and is positioned above a lower end portion of the first duct portion.

4. The utility vehicle according to claim 1, wherein
the inlet opens downward;
the dash panel has a second duct port through which the introduction duct element passes vertically; and
at least a portion of the inlet is deviated in the vehicle width direction from the second duct port when viewed from above and opens so as to face an upper surface of a portion of the dash panel.

5. The utility vehicle according to claim 1, comprising:
a drain trap having a substantially bottomed tube shape;
wherein the drain trap has an opening at an upper end portion thereof; and
the upper end portion of the drain trap is removably coupled to a lower end portion of the introduction duct element.

6. The utility vehicle according to claim 1, wherein the upstream end portion of the main duct element and a downstream end portion of the introduction duct element are removably coupled together via a flexible connecting portion.

7. The utility vehicle according to claim 1, wherein the upstream end portion of the main duct element and a downstream end portion of the introduction duct element are removably coupled together via a rubber-made connecting portion.

8. The utility vehicle according to claim 1, wherein a suspension mechanism is mounted to a bent portion of the upper end portion of the introduction duct element, the bent portion having a substantially-inverted-U-shape.

9. The utility vehicle according to claim 1, comprising:
a second air-intake duct provided in the substantially center portion of the vehicle body frame in the vehicle width direction such that the second air-intake duct extends in the substantially forward and rearward direction and passes through the first duct port;
wherein the driving power source is an engine;
an outlet provided at a downstream end portion of the second air-intake duct is coupled to the engine; and
an inlet provided at an upstream end portion of the second air-intake duct is positioned in the space covered with the hood.

10. A utility vehicle comprising:
a vehicle body frame;
a dash panel provided in a front portion of the vehicle body frame and having a first duct port in a substantially center portion in a vehicle width direction;
a hood provided in the front portion of the vehicle body frame such that the hood is located in front of the dash panel, the hood covering a space defined by the dash panel;
a driving power source mounted to the substantially center portion of the vehicle body frame in the vehicle width direction such that the driving power source is positioned behind the dash panel;
a transmission joined to the driving power source; and
a first air-intake duct provided in the substantially center portion of the vehicle body frame in the vehicle width direction such that the first air-intake duct extends in a substantially forward and rearward direction and passes through the first duct port;
wherein an outlet provided at a downstream end portion of the first air-intake duct is coupled to the transmission;
an inlet provided at an upstream end portion of the first air-intake duct is positioned in an upper portion of the space which is above the first duct port, in a rear portion of the space;
wherein the first air-intake duct includes:
a main duct element extending in the substantially forward and rearward direction such that the main duct element passes through the first duct port; and
an introduction duct element provided in the rear portion of the space covered with the hood such that the introduction duct element extends substantially upward from an upstream end portion of the main duct element;
wherein the inlet is provided at an upstream end portion of the introduction duct element;
wherein the introduction duct element includes:
a base duct portion extending substantially upward from the upstream end portion of the main duct element;
a first duct portion extending substantially vertically in a position above the base duct portion;
a second duct portion extending substantially vertically in a position behind the first duct portion;
a first coupling duct portion of a substantially-L-shape for providing communication between an upper end portion of the base duct portion and a lower end portion of the first duct portion;
a second coupling duct portion of a substantially-inverted-U-shape for providing communication between an upper end portion of the first duct portion and an upper end portion of the second duct portion;
the first duct portion is deviated in the vehicle width direction from the base duct portion when viewed from above; and
the inlet is provided at a lower end portion of the second duct portion.

* * * * *